United States Patent Office 3,790,597
Patented Feb. 5, 1974

3,790,597
SULFUR DERIVATIVES OF ALKYLHYDROXY-PHENYL MALEIMIDES AND COMPOSITIONS THEREOF
Martin Dexter, Briarcliff Manor, and Martin Knell, Ossining, N.Y., and Hans Jakob Peterli, Fullinsdorf, Switzerland, assignors to Ciba-Geigy Corporation, Ardsley, N.Y.
No Drawing. Filed Apr. 12, 1971, Ser. No. 133,448
Int. Cl. C07d 27/10
U.S. Cl. 260—326.5 S                    7 Claims

ABSTRACT OF THE DISCLOSURE

Novel sulfur derivatives of alkylhydroxyphenyl maleimides were prepared. The alkyl-hydroxyphenyl maleimides were prepared by first reacting an alkylhydroxyphenyl amine with maleic anhydride with subsequent cyclization of the maleamic acid to obtain the corresponding maleimide. The sulfur containing derivatives of the alkylhydroxyphenyl maleimide is prepared by reacting the corresponding maleimide with an appropriate mercaptan or dimercaptan compound. The compounds of this invention are useful as stabilizers of organic materials which are subject to oxidative and thermal deterioration.

DETAILED DESCRIPTION

This invention relates to novel sulfur derivatives of alkylhydroxyphenyl maleimides which are useful as stabilizers for organic materials which are subject to thermal and oxidative deterioration.

When the compounds of this invention are incorporated in an organic material, either alone or in combination with other stabilizers or synergists, the organic material will be protected against oxidative and thermal deterioration. The compounds of the present invention are represented by the formulae:

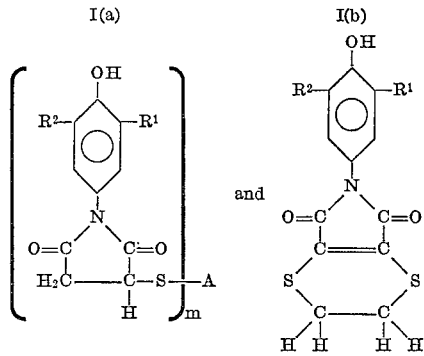

wherein

A is alkyl of from 1 to 18 carbon atoms, ethylene-S-alkyl wherein said alkyl contains from 1 to 18 carbon atoms, benzyl when $m$ is 1; or ethylene-S-ethylene when $m$ is 2, each of $R^1$ and $R^2$ independently is (lower)alkyl of from 1 to 4 carbon atoms, $m$ is 1 or 2.

Illustrative examples of (lower)alkyl groups which are represented by $R^1$ and $R^2$ are methyl, ethyl, propyl, isopropyl, butyl, t-butyl. The preferred groups are t-butyl and methyl.

The sulfur derivatives of the alkylhydroxyphenyl maleimides are useful as stabilizers of organic materials normally subject to oxidative and thermal deterioration. Such organic materials include: synthetic organic polymeric substances such as vinyl resins formed from the polymerization of vinyl halides or from the copolymerization of vinyl halides with unsaturated polymerizable compounds, e.g., vinylesters, $\alpha,\beta$-unsaturated ketones, $\alpha,\beta$-unsaturated aldehydes, and unsaturated hydrocarbons such as butadienes and styrene; poly-$\alpha$-olefins such as polyethylene, polypropylene, polybutylene, polyisoprene, and the like, including copolymers of poly-$\alpha$-olefins; polyurethanes and polyamides such as polyhexamethylene adipamide and polycaprolactam; polyesters such as polyethylene terephthalates; polycarbonates; polyacetals; polystyrene, polybutadiene; polyethyleneoxide; polyacrylonitrile and copolymers such as those of high impact polystyrene containing copolymers of butadiene and styrene and those formed by the copolymerization of acrylonitrile, butadiene and/or styrene.

Other materials which can be stabilized by the compounds of the present invention include lubricating oil of the aliphatic ester type, i.e., di(2 - ethylhexyl)azelate, pentaerythritol tetracaproate, and the like; animal and vegetable derived oils, e.g., linseed oil, fat, tallow, lard, peanut oil, cod liver oil, castor oil, palm oil, corn oil, cottonseed oil, and the like; hydrocarbon materials such as gasoline, mineral oil, fuel oil, drying oil, cutting fluids, waxes, resins, and the like, salts of fatty acids such as soaps and the like.

In general, one or more of the stabilizers of the present invention are employed in amounts, in toto, of from about 0.005 to about 5% by weight of the composition to be stabilized. A particularly advantageous range of the present stabilizers is from about 0.05% to about 2%. The preferred range is particularly effective in polyolefins such as polypropylene.

These compounds may be incorporated in the polymer substance during the usual processing operations, for example, by hot-milling, the composition then being extruded, pressed, roll-molded or the like into films, fibers, filaments, hollow-spheres and the like. The heat stabilizing properties of these compounds advantageously stabilize the polymer against degradation during such processing at the high temperatures generally encountered.

The stabilizers employed in this invention can also be used in combination with other stabilizers or additives. Especially useful co-stablizers are dilauryl-$\beta$-thiodipropionate and distearyl-$\beta$-thiodipropionate.

The following formula represents co-stabilizers which are in certain instances very useful in combination with the stabilizers of this invention:

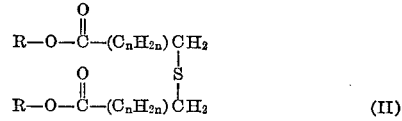

(II)

wherein R is an alkyl group having from 6 to 24 carbon atoms; and $n$ is an integer from 1 to 6. The above co-stabilizers are used in the amount of from 0.01 to 2% by weight of the organic material, and preferably from 0.1 to 1%.

Other antioxidants, antiozonants, thermal stabilizers, ultraviolet light absorbers, coloring materials, dyes, pigments, metal chelating agents, etc., may also be used in the compositions in combination with the stabilizers of the invention.

The compounds of Formula I(a) can be prepared by reacting an alkylated hydroxyphenylamine of the formula

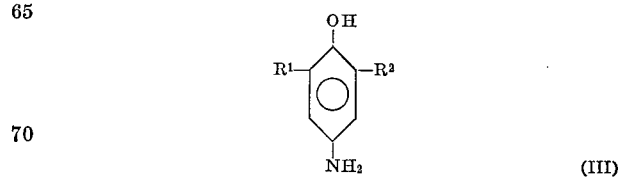

(III)

wherein $R^1$ and $R^2$ are defined above, in a non-aqueous, inert aprotic solvent, with maleic anhydride at room temperature to form a N(alkylhydroxyphenyl)maleamic acid. This maleamic acid is subsequently converted to the maleimide by heating at 100° in acetic anhydride catalyzed with sodium acetate.

The sulfur derivatives of the N(alkylhydroxyphenyl) maleimide are prepared by reacting the maleimide derivative with a mercaptan or dimercaptan in an inert solvent such as ether at room temperature using trimethylbenzylammonium methoxide as a catalyst.

The compounds of Formula I(b) can be prepared by reacting 3,6 - dithia - delta-1-cyclohexene 1,2-dicarboxylic acid anhydride with an amino phenol. Said anhydride can be prepared by the method described in Wolf et al., Ang. Chem. 72, 963 (1960).

The following examples, presented for illustration and not limitation, will serve to typify further the nature of the present invention.

EXAMPLE 1

N(3,5-di-t-butyl-4-hydroxyphenyl)maleimide

To a solution of 19.6 g. of maleic anhydride in 200 ml. of ether was added a slurry of 44.2 g. of 4-amino-2,6-di-t-butylphenol in 200 ml. of ether with rapid stirring at room temperature. After 2 hours, the reaction mixture was cooled to 5° C., filtered and washed with petroleum ether. The N(3,5-di-t-butyl-4-hydroxyphenyl)maleamic acid obtained at this point was air-dried and had a melting point of 206–7° C.

Sodium acetate (5 g.) was slurried in 25 ml. of acetic anhydride. To this slurry was added 15.95 g. of the above formed maleamic acid. The reaction mixture was then heated on a steam bath for 1 hour. After cooling to room temperature, the reaction mixture is poured into 100 ml. of cold water. The product is filtered and washed with water and dried. The product is subsequently dissolved and recrystallized from benzene, ethanol and again from benzene to yield the desired product with the melting point of 210–212° C. A typical analysis is as follows.

Calculation for $C_{18}H_{23}NO_3$.—Calculated (percent): C, 71.73; H, 7.69. Found (percent): C, 71.72; H, 7.65.

In a like fashion by substituting other alkylhydroxyphenylamines such as 4-amino-2,6-dimethylphenol, 4-amino-2-methyl-6-tertiarybutylphenol for 4-amino-2,6-di-t-butylphenol in the initial procedure of the example, there are respectively obtained N(3,5-dimethyl-4-hydroxyphenyl)maleimide and N(3 - methyl-5-t-butyl-4-hydroxyphenyl)maleimide.

EXAMPLE 2

N(3,5-di-t-butyl-4-hydroxyphenyl)-α-octadecylthiosuccinimide

To 50 ml. of ether was added 9.03 g. of N(3,5-di-t-butyl-4-hydroxyphenyl)maleimide, 8.85 g. octadecyl mercaptan and 5 drops of trimethylbenzylammonium methoxide. The reaction was mildly exothermic and the reaction was continued for about 16 hours at room temperature. The reaction mixture was washed with water and dried over magnesium sulfate. The solvent was evaporated to dryness after which the product was recrystallized first from methanol and then from hexane. The product was air dried at room temperature and had a melting point of 76–77.5° C. A typical analysis is as follows.

Calculated for $C_{36}H_{61}NO_3S$.—Calculated (percent): C, 73.54; H, 10.46. Found (percent): C, 73.66; H, 10.58.

By following the procedure of this example, and using an equivalent amount of N(3-methyl-5-t-butyl-4-hydroxyphenyl)-maleimide and methylmercaptan, in place of the above reactants one obtains N(3-methyl-5-t-butyl-4-hydroxyphenyl)methylthiosuccinimide.

In a similar fashion, the following compounds are prepared:

(1) N(3 - methyl-5-t-butyl-4-hydroxyphenyl)-α-octylthiosuccinimide is obtained by reacting N(3-methyl-5-t-butyl-4-hydroxyphenyl)maleimide and octylmercaptan.

(2) N(3,5-di-t-butyl-4-hydroxyphenyl) - α - butylthiosuccinimide is obtained by reacting N(3,5-di-t-butyl-4-hydroxyphenyl)maleimide and butylmercaptan. The procedure has a melting point of 120° C.

(3) N(3,5 - di-t-butyl-4-hydroxyphenyl)benzylthiosuccinimide is obtained by reacting N(3,5-di-t-butyl-4-hydroxyphenyl)maleimide and benzylmercaptan. The product has a melting point of 149° C.

EXAMPLE 3

N,N'-bis(3,5-di-t-butyl-4-hydroxyphenyl)-thiobis-(α-ethylthiosuccinimide)

To a slurry containing 9.03 g. of N(3,5-di-t-butyl-4-hydroxyphenyl)maleimide and 2.51 g. of bis(mercaptoethyl) sulfide in 50 ml. of ether was added 10 drops of trimethylbenzylammonium methoxide. The reaction mixture was stirred at room temperature for about 16 hours after which the reaction mixture was washed with water and dried over calcium chloride.

The mixture was filtered and the ether was stripped to yield a yellow solid. The product was first recrystallized from methanol and then from ethanol. The product obtained had a melting point of 215–217.5° C. A typical analysis is as follows:

Calculated for $C_{40}H_{56}N_2O_6S_3$.—Calculated (percent): C, 64.57; H, 7.45; S, 12.70. Found (percent): C, 63.39; H, 7.32; S, 12.68.

EXAMPLE 4

N(3,5-di-t-butyl-4-hydroxyphenyl)-α-n-dodecylthioethylthiosuccinimide

To a slurry of 9.03 g. of N(3,5-di-t-butyl-4-hydroxyphenyl)maleimide and 7.86 g. of n-dodecylthioethyl mercaptan in 50 ml. of ether was added 3 drops of trimethylbenzylammonium methoxide. The reaction mixture was stirred for approximately 16 hours at room temperature. The ether was evaporated and the product was dissolved in benzene after which the benzene solution containing the product was washed three times with water. The benzene was separated and dried over magnesium sulfate. The benzene solution was evaporated yielding 16.4 g. of the product which was a viscous, reddish-brown oil with a refractive index at 21° C. at 1.5356.

Calculated for $C_{32}H_{53}NO_3S_2$.—Calculated (percent): C, 68.15; H, 9.47; S, 11.34. Found (percent): C, 68.05; H, 9.49; S, 11.38.

By following the procedure of this example, and using an equivalent amount of N(3-methyl-5-t-butyl-4-hydroxyphenyl)maleimide and methylthioethyl mercaptan in place of the above reactants, one obtains N(3-methyl-5-t-butyl - 4 - hydroxyphenyl) - α - methylthioethylthiosuccinimide.

In a similar fashion, N(3,5-dimethyl-4-hydroxyphenyl)-α-ethylthioethylthiosuccinimide is obtained by reacting N-(3,5-dimethyl - 4 - hydroxyphenyl)maleimide with methylthioethyl mercaptan.

EXAMPLE 4(A)

N(3,5-di-t-butyl-4-hydroxyphenyl)-3',6'-dithiacyclohex-1'-ene-1",2"-dicarboximide One-tenth of one mole of each of 3,6-dithia-delta 1-cyclohexene 1,2-dicarboxylic acid anhydride and 4-amino-2,6-di-t-butylphenol were refluxed for about 13 hours in 20 ml. of acetic acid and 50 ml. of toluene. At the end of the reaction the solvents were evaporated and the reaction mixture was cooled and filtered. The solid material was washed with hexane and then recrystallized from ethanol. The above named product had a melting point of 166° C.

EXAMPLE 5

A batch of unstabilized polypropylene powder (Hercules Profax 6501) was thoroughly blended with 0.5% by weight of various compounds of this invention. The blended materials were than milled on a two-roll mill at 182° C., for 10 minutes, after which time the stabilized polypropylene was sheeted from the mill and allowed to cool.

The milled polypropylene sheets were then cut into pieces and pressed for 7 minutes on a hydraulic press at 218° C., 2,000 pounds per square inch pressure. The resulting sheet of 25 mil thickness were tested for resistance to accelerated aging in a forced draft oven at 150° C. The results are set out in Table I below.

TABLE I

| Additive(s): | Oven aging at 150° C., hours to failure |
|---|---|
| 0.5% of N(3.5-di-t-butyl-4-hydroxyphenyl)-α-decylthioethylthiosuccinimide | 1110 |
| 0.5% of N(3,5-di-t-butyl-4-hydroxyphenyl)-α-octadecylthiosuccinimide | 1420 |
| 0.5% of N,N' - bis(3,5-di-t-butyl-4-hydroxyphenyl)thiobis(α - ethylthiosuccinimide) | 663 |
| Unstabilized polypropylene | 3 |

The above data clearly indicates the significant increase in the stabilization of polypropylene upon addition of the antioxidants of the present invention.

EXAMPLE 6

To 39.3 g. (0.15 mole) of hexamethylene diammonium adipate is added 0.177 g. (7.5×10⁻⁴ mole; 0.5 mole percent) of hexamethylene diammonium diacetate as molecular weight control agent, and 0.183 g. (0.5% of theoretical nylon yield) of N(3,5-di-t-butyl-4-hydroxyphenyl)-α-octadecylthiosuccinimide. The mixture is blended thoroughly and added to a Pyrex polymer tube.

The polymer tube is evacuated three times and each time filled with high purity nitrogen. The polymer tube with the continuously maintained, slightly positive nitrogen pressure, is placed in a methyl salicylate vapor bath at 220° C. After one hour at 222° C. the polymer tube is transferred to an o-phenyl-phenol bath at 285° C. for one hour. The polymer tube is kept in the 285° C. vapor bath for an additional ½ hour while it is maintained under vacuum of less than 1 mm. pressure. High purity nitrogen is then readmitted and the polymer tube is allowed to cool.

The nylon-6,6 obtained is ground in a mill at ambient temperature of 25° C. About 2 g. are heated in a small glass Petri dish in a circulating air-rotary oven at 140° C. for 65 hours. The viscosity of a 1% sulfuric acid solution of aged and unaged polymer samples are determined at 25° C. Stabilizer effectiveness is judged by the percent retention of specific viscosity, color-formation, and weight retention after oven aging. The stabilized polyamide has better viscosity, color retention and substantially less weight loss after oven aging than a polyamide which is unstabilized.

Stabilized polyamide compositions are prepared in a similar manner as above with the following stabilizers:

(a) 0.5% of N,N'-bis(3,5 - di - t-butyl-4-hydroxyphenyl)-thiobis(α-ethylthiosuccinimide)
(b) 0.5% of N(3,5-di-t-butyl-4-hydroxyphenyl)-α-n-dodecylthioethylthiosuccinimide)
(c) 0.5% of N(3-methyl-5-t-butyl-4-hydroxyphenyl)-α-octylthiosuccinimide
(d) 0.5% of N(3-methyl-5-t-butyl-4-hydroxyphenyl)-methylthioethylthiosuccinimide.

Substantially similar results are obtained when 0.5% of the aforementioned stabilizers are incorporated into nylon-6,6 flakes before extrusion.

EXAMPLE 7

A quantity of SBR emulsion containing 100 g. of rubber (500 ml. of 20% SBR obtained from Texas U.S. Synpol 1500) previously stored under nitrogen, is placed in a beaker and stirred vigorously. The pH of the emulsion is adjusted to 10.5 with a 0.5 N NaOH solution.

To the emulsion is added 50 ml. of 25% NaCl solution. A 6% NaCl solution of pH 1.5 is added in a thin stream with vigorous stirring. When pH 6.5 is reached, the rubber begins to coagulate and the addition is slowed down in order to maintain uniform agitation. The addition of the acidic 6% NaCl solution is terminated when a pH 3.5 is reached. The coagulated crumb-rubber slurry at pH 3.5 is stirred for ½ hour.

The coagulated rubber is isolated by filtration through cheese cloth, and rinsed with distilled water. After three subsequent washing with fresh distilled water, the coagulated rubber is dried, first at 25 mm. Hg and finally to constant weight under high vacuum (<1 mm.) at 40–45° C.

The dried rubber (25 g.) is heated under nitrogen at 125° C. in a Brabender mixer and to this is added with mixing 1.25 g. (0.5%) of N,N'-bis(3,5-di-t-butyl-4-hydroxyphenyl)thiobis(α-ethylthiosuccinimide). The composition is mixed for 5 minutes after which it is cooled and compression molded at 125° C. into 5" x 5" x 0.025" plaques.

The plaques are placed on aluminum sheets and heated in a circulating air oven at 100° C. for up to 96 hours. The viscosity of a 0.5% toluene solution of aged and unaged rubber samples are determined at 25° C. Stabilizer effectiveness is judged by the percent retention of specific viscosity, color formation and gel content after oven aging. The stabilized rubber has better viscosity, color retention and less gel content after oven aging than the rubber which is unstabilized.

Similar results are obtained when N(3,5-di-t-butyl-4-hydroxyphenyl)-α-n - dodecylthioethylthiosuccinimide or N(3,5 - di - t - butyl - 4 - hydroxyphenyl) - α - octadecylthiosuccinimide is used in place of N,N'-bis(3,5-di-t-butyl-4-hydroxyphenyl)thiobis(α - ethylthiosuccinimide) in the rubber composition.

EXAMPLE 8

High impact polystyrene resin containing elastomer (i.e., butadiene-styrene) is stabilized against loss of elongation properties by incorporation of 0.5% by weight of N,N'-bis(3,5-di-t-butyl - 4 - hydroxyphenyl)thiobis(α-ethylthiosuccinimide). Under the test conditions described below, the stabilized resin retains a higher percentage of its original elongation properties, whereas the unstabilized resin retains less elongation properties. A substantial improvement in stability is also noted when only 0.05% of the stabilizer is employed.

The unstabilized resin is dissolved in chloroform and the stabilizer then added, after which the mixture is cast on a glass plate and the solvent evaporated to yield a uniform film which, upon drying, is removed and cut up, and then pressed for 7 minutes at a temperature of 163° C. and a pressure of 2,000 pounds per square inch into a sheet of uniform thickness (25 mil). The sheets are then cut into strips, approximately 4 x 0.5 inches. A portion of these strips is then measured for length of elongation in the Instron Tensile tester (Instron Engineering Corporation, Quincy, Mass). The remaining portion of the strips is aged in a forced draft oven for 6 weeks at 75° C. and thereafter tested for elongation.

EXAMPLE 9

Cyclohexene, freshly distilled was stabilized by the addition thereto of 0.01% by weight of N(3-methyl-5-t- butyl-4-hydroxyphenyl)methylthiosuccinimide. The effectiveness of this stabilizer in cyclohexene is tested by the ASTM D525-55 oxidation test. The stabilized cyclohexene ran 47 minutes to failure while the unstabilized cyclohexene failed after 30 minutes.

EXAMPLE 10

A stabilized mineral oil composition is prepared by incorporating into a refined mineral oil of 183 S.U.S. at 100° F. (Regal Oil, B, Texas Company) 0.005% by weight of N(3,5-di-methyl-4-hydroxyphenyl)methylthioethylsuccinimide.

EXAMPLE 11

A stabilized high temperature lubricating oil is prepared by incorporating 2% by weight of N(3,5-di-t-butyl-4-hydroxyphenyl)-α-n-dodecylthioethylthiosuccinimide to the lubricant, which comprises diisoamyl adipate. The stabilized composition is compared with the unstabilized lubricant by heating at 175° in the presence of air and metallic catalysts according to the test method described in Military Specification Mil-I-7808c. After 72 hours, the blank containing no stabilizer contains more sludge and has a greater viscosity than the stabilized lubricant.

EXAMPLE 12

A composition is prepared comprising linear polyethylene and 1.0% by weight of N(3-,5-di-t-butyl-4-hydroxyphenyl)methylthioethylthiosuccinimide. The composition is injected molded into tensile bars which are placed in a circulating air oven at 120° C. In contrast to those molded from unstabilized linear polyethylene, tensile bars molded from the instant composition retained its tensile strength for a substantially longer period.

EXAMPLE 13

A composition comprising an acrylonitrile butadiene-styrene terpolymer and 0.1% N(3,5-di-t-butyl-4-hydroxyphenyl)-α-n-dodecylthioethylthio succinimide resists discoloration at 120° C. longer than one which does not contain the stabilizer.

What is claimed is:
1. A compound of the formula

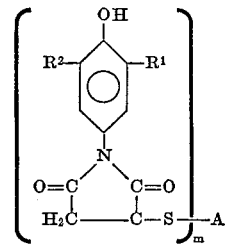

wherein
A is alkyl of from 1 to 18 carbon atoms, ethylene-S-alkyl wherein said alkyl contains from 1 to 18 carbon atoms, benzyl when $m$ is 1; or ethylene-S-ethylene when $m$ is 2,
each of $R^1$ and $R^2$ independently is (lower)alkyl of from 1 to 4 carbon atoms, and
$m$ is 1 or 2.

2. The compound according to claim 1 wherein the (lower)alkyl is t-butyl or methyl.

3. The compound according to claim 2 which is N(3,5-di-t-butyl - 4 - hydroxyphenyl)-α-octadodecylthiosuccinimide.

4. The compound according to claim 2 which is N,N'-bis - 3,5 - di-t-butyl-4-hydroxyphenyl)thiobis(α-ethylthiosuccinimide).

5. The compound according to claim 2 which is N(3,5-di-t-butyl - 4 - hydroxyphenyl)-α-n-dodecylthioethylthiosuccinimide.

6. The compound according to claim 2 which is N(3,5-di-t-butyl-4-hydroxyphenyl)n-butylthiosuccinimide.

7. The compound according to claim 2 which is N(3,5-di-t-butyl-4-hydroxyphenyl)benzylthiosuccinimide.

References Cited
UNITED STATES PATENTS
3,278,526   10/1966   Louthan et al. _____ 260—239.3

JOSEPH A. NARCAVAGE, Primary Examiner

U.S. Cl. X.R.

252—401; 260—376.5 SA, 45.8 SN